United States Patent
Fu et al.

(10) Patent No.: US 7,039,261 B2
(45) Date of Patent: May 2, 2006

(54) ETALON BASED COMPACT DISPERSION MODULE

(75) Inventors: Xiaoli Fu, Nepean (CA); Tongqing Wang, La Canada, CA (US); Jinghui Li, Arcadia, CA (US); Tiangong Liu, Mountain View, CA (US); Feng Shi, Kanata (CA); Genzao Zhang, Ottawa (CA)

(73) Assignee: Oplink Communications, Inc., Fremont, CA (US)

( * ) Notice: Subject to any disclaimer, the term of this patent is extended or adjusted under 35 U.S.C. 154(b) by 0 days.

(21) Appl. No.: 10/826,658

(22) Filed: Apr. 15, 2004

(65) Prior Publication Data

US 2005/0036736 A1 Feb. 17, 2005

Related U.S. Application Data

(60) Provisional application No. 60/462,735, filed on Apr. 15, 2003.

(51) Int. Cl.
*G02B 6/00* (2006.01)
*G02B 6/27* (2006.01)
*G02F 1/01* (2006.01)

(52) U.S. Cl. .......................... 385/11; 385/47; 359/260
(58) Field of Classification Search ................ 385/11, 385/47; 359/260, 337.5; 398/81, 147, 159
See application file for complete search history.

(56) References Cited

U.S. PATENT DOCUMENTS

| | | | | |
|---|---|---|---|---|
| 6,804,057 B1 * | 10/2004 | Vakoc | .................. | 359/485 |
| 6,804,467 B1 * | 10/2004 | Colbourne et al. | ......... | 398/159 |
| 2004/0004764 A1 * | 1/2004 | Campbell et al. | ........... | 359/495 |
| 2004/0190906 A1 * | 9/2004 | Jain | ........................... | 398/147 |

* cited by examiner

*Primary Examiner*—Michelle Connelly-Cushwa
(74) *Attorney, Agent, or Firm*—Fish & Richardson P.C.

(57) ABSTRACT

Systems and methods for providing compact dispersion compensation modules. In one implementation, a dispersion compensation module includes a polarizer having a first port, a second port, and a third port. The dispersion compensation module also includes a reflection etalon and a quarter-waveplate positioned between the reflection etalon and the second port of the polarizer.

23 Claims, 13 Drawing Sheets

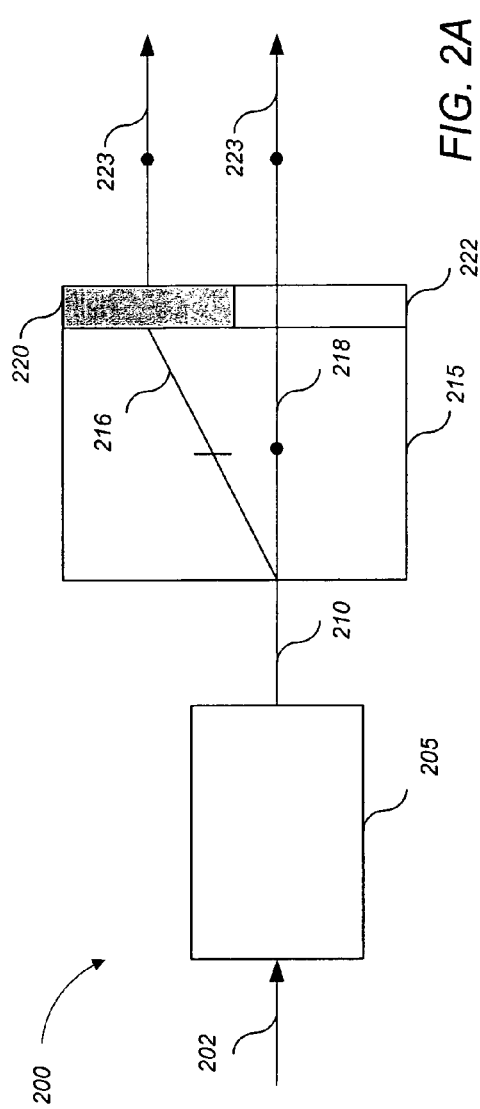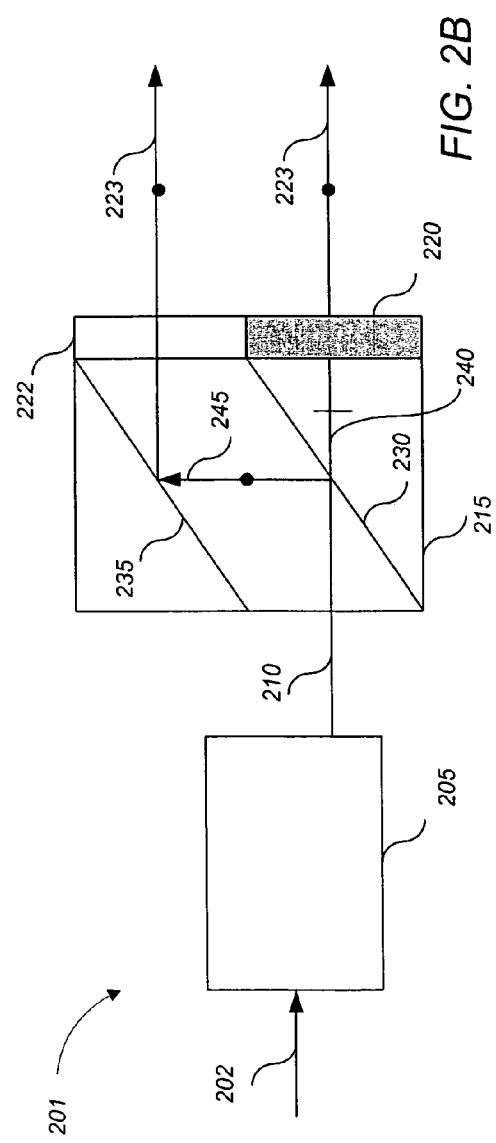

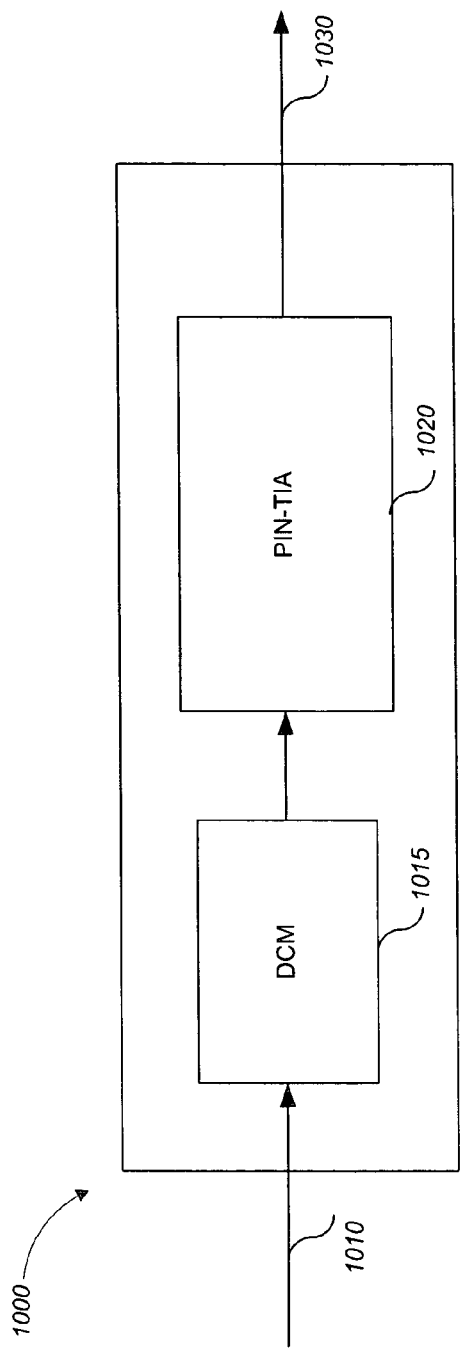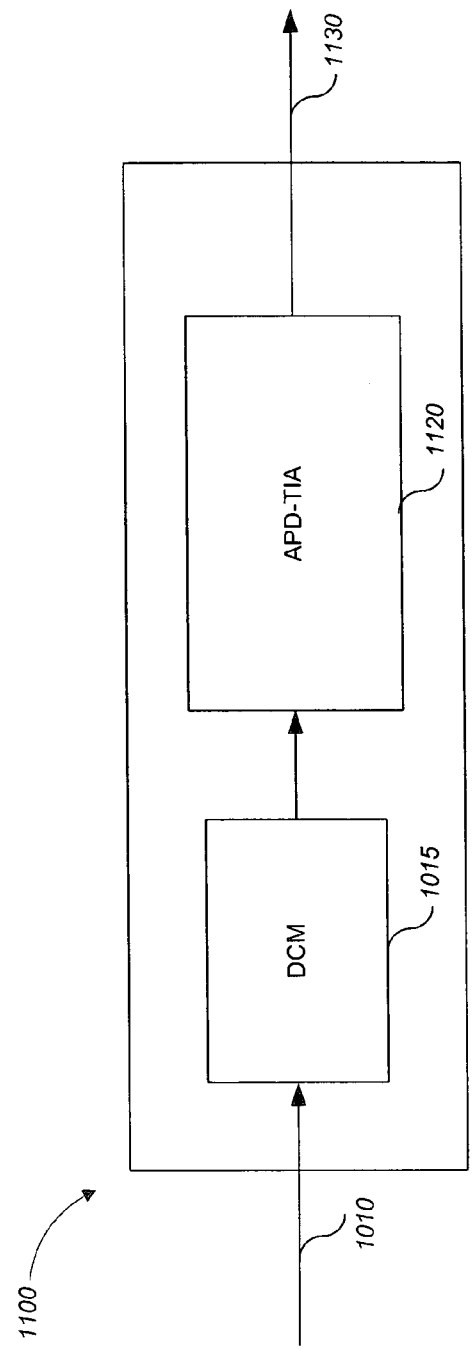

ETALON BASED COMPACT DISPERSION MODULE

CROSS-REFERENCE TO RELATED APPLICATIONS

This application is a continuation application of and claims priority to U.S. Provisional Application Ser. No. 60/462,735, filed on Apr. 15, 2003.

BACKGROUND

The present specification relates to optical systems.

Chromatic dispersion ("CD") is typically caused by different frequency components of optical signals having slightly different group velocities when transmitted through a chromatically dispersive medium. As a result, different frequency components of a transmitted optical signal can propagate at different speeds, thus arriving at a receiver at slightly different times. Chromatic dispersion can degrade performance in fiber optic systems by increasing the system bit error rate. Chromatic dispersion can be either negative or positive depending upon the transmission medium. For example, the group velocities of components of an optical signal in one medium can be higher for components having a higher frequency (positive chromatic dispersion) while in another medium the group velocities can be lower for components having a higher frequency (negative chromatic dispersion).

Fiber optical systems having different bit rates typically have different chromatic dispersion tolerance requirements. For a conventional system, the higher the bit rate the smaller the chromatic dispersion tolerance of the system. For example, in a conventional 10 Gbps system the CD tolerance can be about 500 ps/nm while in a conventional 40 Gbps system the CD tolerance can be about 30 ps/nm. To reduce the amount of chromatic dispersion in fiber optical systems, dispersion compensation modules ("DCMs") can be used. A DCM typically provides a chromatic dispersion opposite in sign and equal in magnitude to the dispersion that a transmitted optical signal experiences. Conventional technologies for implementing DCMs include using dispersion compensation fiber and fiber Bragg gratings.

SUMMARY

The present specification provides systems and methods for providing compact DCMs, which exploit potential space saving advantages associated with the redirection of polarized optical signals or polarized components of optical signals. The compact DCM can be packaged in a dispersion tolerant receiver which includes a wavelength tracking apparatus for use in controlling the DCM.

In general, in one aspect, the specification provides for a dispersion compensation module. The dispersion compensation module includes a polarizer having a first port, a second port, and a third port. The dispersion compensation module also includes a reflection etalon and a quarter-waveplate positioned between the reflection etalon and the second port of the polarizer.

Implementation of the dispersion compensation module can include one or more of the following features. The dispersion compensation module can be operable to apply a group delay profile to at least one optical signal. The polarizer can be operable to redirect a first optical signal having a first polarization input at the first port to be output from the second port and to redirect a second optical signal having a second polarization perpendicular to the first polarization input at the second port to be output at the third port. The reflection etalon can be operable to apply a group delay profile to the first optical signal output from the second port. The polarizer can be operable to rotate a polarization of the first optical signal output from the second port by 45 degrees and allow the first optical signal to propagate toward the reflection etalon, the quarter waveplate for rotating a polarization of an optical signal reflected back from the reflection etalon by a further 45 degrees into a second optical signal having a second polarization perpendicular to the first polarization and allowing the second optical signal to be input at the second port of the polarizer.

The dispersion compensation module can further include a tuner coupled to the reflection etalon, operable to adjust a resonant frequency of the reflection etalon. The tuner can be a heater or one or more electrodes. The dispersion compensation module can further include a controller coupled to the tuner and operable to control the tuner.

In general, in a another aspect, the specification provides dispersion compensation module. The dispersion compensation module includes a plurality of etalon assemblies, each etalon assembly for applying a group delay profile to the at least one optical signal, each etalon assembly arranged so that the at least one optical signal passes at least once therethrough. Each etalon assembly includes a polarizer having a first port, a second port, and a third port, said polarizer for redirecting a first optical signal having a first polarization input at the first port to be output from the second port, said polarizer for redirecting a second optical signal having a second polarization perpendicular to the first polarization input at the second port to be output at the third port. Each etalon assembly including a reflection etalon arranged for application of a group delay profile to the first optical signal output from the second port. Each etalon assembly also including a quarter-wave plate located between the reflection etalon and the polarizer, for rotating a polarization of the first optical signal output from the second port by 45 degrees, and allowing said optical signal to propagate toward the reflection etalon, said quarter-wave plate for rotating a polarization of an optical signal reflected back from the reflection etalon by a further 45 degrees into a second optical signal having a second polarization perpendicular to the first polarization and allowing said second optical signal to be input at the second port of the polarizer.

In general, in another aspect, the specification provides a dispersion tolerant receiver module. The dispersion tolerant receiver module includes, a dispersion compensation module. The dispersion compensation module includes a polarizer having a first port, a second port, and a third port. The dispersion compensation module includes a reflection etalon and a quarter-waveplate positioned between the reflection etalon and the second port of the polarizer. The dispersion compensation module also includes a photodetector coupled to the dispersion compensation module. Implementations of the dispersion tolerant receiver module can include one or more of the following features. The photodetector can be a PIN-TIA. The photodetector can be an APD-TIA.

In general, in another aspect, a wavelength tracking apparatus is provided. The wavelength tracking apparatus includes a beam splitter for receiving an optical signal from a dispersion compensation module, and for outputting a reference optical signal and a monitoring optical signal. The wavelength tracking apparatus includes a reference photodiode for receiving said reference optical signal. The wavelength tracking apparatus includes a monitor etalon for transmitting the monitoring optical signal. The wavelength tracking apparatus includes a monitor photodiode for receiving an optical signal transmitted by the monitor etalon and a controller operable to adjust a frequency shift of a group delay profile of the dispersion compensation module using a ratio between a power of optical signals on the monitor photodiode and a power of optical signals on the reference photodiode.

In general, in another aspect, a dispersion compensation module is provided. The dispersion compensation module includes an etalon assembly pair. The etalon assembly pair includes a first etalon assembly. The first etalon assembly includes a first polarizer having a first port, a second port, and a third port, a first reflection etalon, and a first quarter-waveplate positioned between the reflection etalon and the second part of the polarizer. The etalon assembly pair also includes a second etalon assembly. The second etalon assembly includes a second polarizer having a first port, a second port, and a third port, a second reflection etalon, and a second quarter-waveplate positioned between the reflection etalon and the second part of the polarizer. The third port of the first polarizer is coupled to the third port of the second polarizer.

Implementations of the dispersion compensation module can include one or more of the following features. The first polarizer can be operable to redirect a first optical signal, having an initial polarization, input at the first port to be output from the second port and to redirect a second optical signal, having a polarization perpendicular to the initial polarization, input at the second port to be output at the third port. The second polarizer can be operable to redirect a first optical signal, having an initial polarization, input at the third port to be output from the second port and to redirect a second optical signal, having a polarization perpendicular to the initial polarization, input at the second port to be output at the first port. The dispersion compensation module can be operable to apply a group delay profile to at least one optical signal. Each reflection etalon can be operable to apply a portion of a group delay profile to the optical signal. Each polarizer can be operable to rotate an initial polarization of an optical signal output from a second port by 45 degrees and allow the optical signal to propagate toward each reflection etalon, the quarter waveplate for rotating a polarization of an optical signal reflected back from the reflection etalon by a further 45 degrees into an optical signal having a polarization perpendicular to the initial polarization and allowing the optical signal to be input at a same second port of each polarizer.

The dispersion compensation module can further include a single polarization collimator coupled to port one of each polarizer. The dispersion compensation module can further include a reflector coupled to the second etalon assembly. The dispersion compensation module can further include a tuner coupled to each reflection etalon and operable to adjust a resonant frequency of each reflection etalon. The tuner can be a heater or can be one or more electrodes. The dispersion compensation module can further include a controller coupled to each tuner and operable to control each tuner. The dispersion compensation module can further include a plurality of etalon assembly pairs, wherein a first port of a each etalon assembly pair is coupled to a first port of a another etalon assembly pair such that an optical signal can be directed to input at a first port of a first etalon assembly pair of the plurality of etalon assembly pairs and output at a first port of a last etalon assembly pair of the plurality of etalon assembly pair.

Other aspects and features of the present invention will become apparent to those of ordinary skill in the art upon review of the following description of specific embodiments The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A illustrates one implementation of a single polarization collimator.

FIG. 2B illustrates one implementation of a single polarization collimator.

FIG. 10 illustrates a dispersion tolerant receiver module including a PIN photodiode detector in combination with a trans-impedance amplifier.

FIG. 11 illustrates a dispersion tolerant receiver module including an APD photodiode detector in combination with a trans-impedance amplifier.

DETAILED DESCRIPTION

Figure 1:
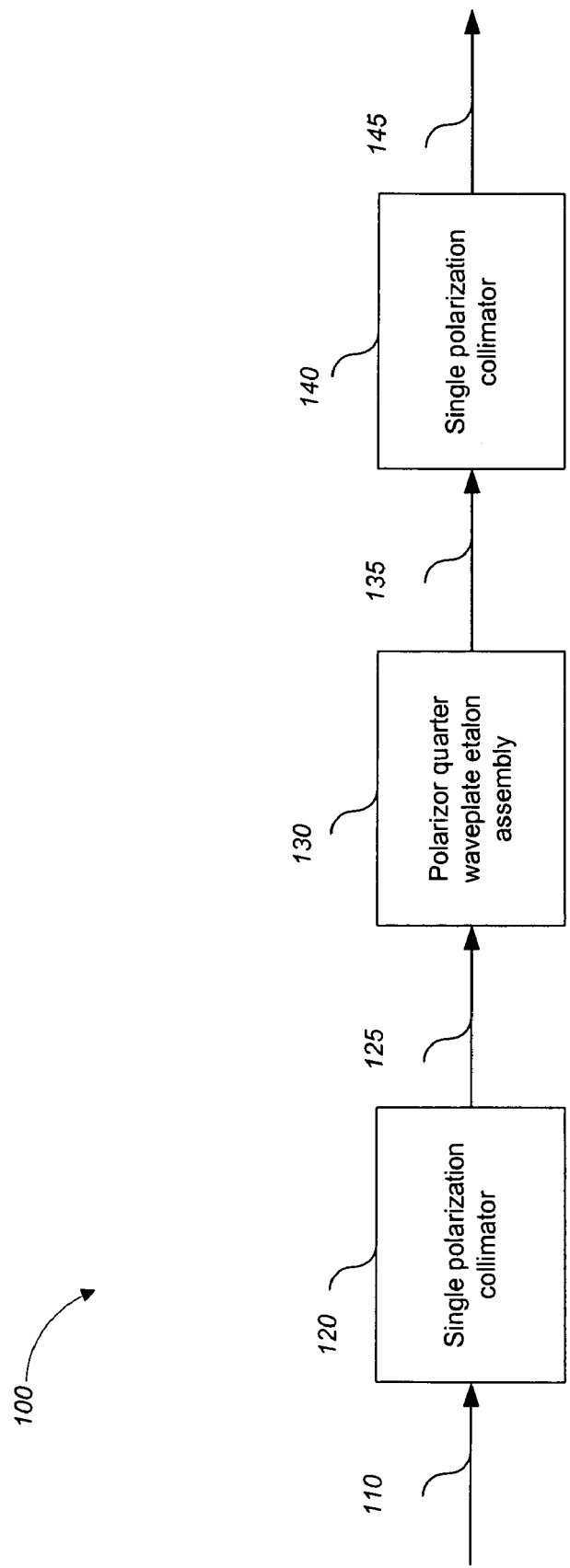
FIG. 1 is a block diagram of a dispersion compensation module.

FIG. 1 illustrates a block diagram of one implementation of a dispersion compensation module 100. Dispersion compensation module 100 includes a first single polarization collimator 120, a polarizer-quarter waveplate-etalon assembly 130, and a second single polarization collimator 140. In operation, first single polarization collimator 120 receives an input light 110 having an arbitrary polarization state. An output light 125 from the single polarization collimator 110 has a single polarization state of a known direction. The output light 125 can then be input into a polarizer-quarter waveplate-etalon assembly 130. The polarizer-quarter waveplate-etalon assembly is operable to compensate for some or all of the dispersion present in optical signal 125. An output light 135 can then be input into a second single polarization collimator 140, which outputs optical signal 145, for example, to an output optical fiber (not shown).

FIGS. 2A and 2B illustrate two example implementations of single polarization collimator 110. Referring to FIG. 2A, a single polarization collimator 200 is shown. The single polarization collimator 200 includes a conventional collimator 205, a birefringent material 215, a half waveplate 220, and a spacer 222. In operation, an optical signal 202, which can be arbitrarily polarized and can be uncollimated, is input into collimator 205. Collimator 205 collimates the optical signal 202 into a collimated optical signal 210. Collimated optical signal 210 is separated by birefringent material 215 into a first optical signal 216 and a second optical signal 218 having a first polarization and a second polarization respectively, and where the first and second polarizations are orthogonal.

The first optical signal 215, having a first polarization, passes through the half waveplate 220 in which the polarization of the first optical signal 215 is rotated by 90 degrees to the second polarization, and output from the single polarization collimator 200. The second optical signal, having the second polarization, passes through spacer 222 and is output from the single polarization collimator 110. The output 223 from the single polarization collimator 200 is a collimated optical signal having a single polarization (e.g., the second polarization). In one implementation, the birefringent material is a $YVO_4$ Crystal, however, in other implementations, other birefringent materials can be used.

Referring now to FIG. 2B, a single polarization collimator 201 is shown. Single polarization collimator 201 includes conventional collimator 205, a polarization beam splitter 215 that includes polarization beam splitting coatings 230 and 235, a half waveplate 220 and spacer 222. In operation, an optical signal 202, which can be arbitrarily polarized and can be uncollimated, is input into collimator 205. Collimator 205 collimates the optical signal 202 into collimated optical signal 210. Collimated optical signal 210 enters polarization beam splitter 215 and is separated by polarization beam splitting coating 230 into a first optical signal 240 having a first polarization and a second optical signal 245 having a second polarization, which is orthogonal to the first polarization. First optical signal 245 is reflected by first and second polarization beam splitting coatings 230 and 235, respectively, to spacer 222 and output as optical signal 223. In one implementation, spacer 222 is composed of glass. Second optical signal 240 passes through first polarization beam splitting coating 230 and passes through half wave plate 220 which rotates the polarization of the second optical signal 240 by 90 degrees from the first polarization to the second polarization and output as optical signal 223. As with single polarization collimator 200, the output 223 from the single polarization collimator 201 is a collimated optical signal having a single polarization (e.g., having the second polarization). Other implementations of single polarization collimators can be used.

Figure 3:
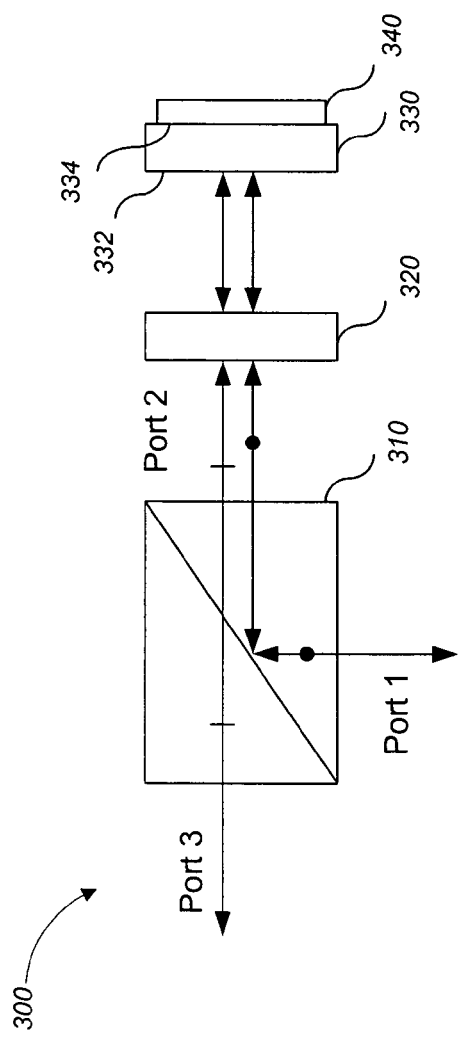
FIG. 3 illustrates a polarizer-quarter waveplate-etalon assembly.

FIG. 3 illustrates a one implementation of a polarizer-quarter waveplate-etalon assembly 300. Polarizer-quarter waveplate-etalon assembly 300 includes a polarizer 310 having three ports, a quarter waveplate 320, an etalon 330, and a tuner 340.

Etalon 330 is an optical device with at least two parallel reflection surfaces separated by a medium. When collimated light is reflected by etalon 330, frequency dependant group delay can be generated. Etalon 330 can be a reflection etalon, or more particularly, a Fabry-Parot etalon with one mirror having 100 percent target reflectivity. The Fabry-Parot etalon includes a front surface, or mirror, which is partially reflective, and a second surface, or mirror, which is 100 percent reflective. Light is input and output on the same side of etalon 330. The group delay response can be periodic in frequency, which can be illustrated as a series of resonant peaks. The period of the group-delay response is referred to as the free spectral range ("FSR"). The FSR of etalon 330 is determined by the spacing between the two mirrors, the refractive index of the cavity, and the incident beam angle. A frequency at which the group delay response reaches a maximum is a resonant frequency. The resonant frequency is centered at a resonant peak of a group delay versus frequency profile. The FSR can be identified by the distance in frequency between centers of resonant peaks. A dispersion compensating delay can be applied to optical signals at different frequencies. The frequencies can be changed by altering the resonant frequency of the etalon 330 such as by tuner 340.

In operation, a collimated optical signal having a single polarization entering the polarizer 310 from port one is output at port two as a collimated optical signal having the same polarization. The collimated polarized optical signal passes though the quarter waveplate 320, which rotates the polarization by 45 degrees. The rotated optical signal is passed to etalon 330 where a portion of the incident light is reflected upon a first surface 332 of the etalon 330 and a remaining portion of the incident light is transmitted to a second surface 334 of the etalon 330. The second surface 334 can have 100 percent reflectivity so that all incident light is reflected. The delay generated by the etalon 330 performs some or all of the dispersion compensation for the optical signal. The light, reflected from both the first and second etalon surfaces 332 and 334, passes back through quarter waveplate 320, which rotates the polarization by another 45 degrees, resulting in a total rotation of 90 degrees such that the exiting optical signal, at port 3, has a polarization orthogonal to the initial polarization. The optical signal input at port two, having the polarization orthogonal to the initial polarization, is output at port three.

Polarizer 310 can also pass an optical signal in the opposite direction. A collimated optical signal having a single polarization (the initial polarization) that is the same polarization as the optical signal exiting port three above, can similarly be input into port three of polarizer 310. The optical signal input into port three is output at port two as an optical signal having the same polarization. The collimated polarized optical signal passes though the quarter waveplate 320, which rotates the polarization by 45 degrees. The rotated optical signal passes to etalon 330 where the optical signal is reflected, as described above, and passed back through quarter waveplate 320. Quarter waveplate 320 imparts another 45 degree rotation to the polarization resulting in a total rotation of 90 degrees such that the optical signal exiting polarizer 310 at port 1 has a polarization orthogonal to the initial polarization.

In one implementation, polarizer 310 includes a polarization beam splitter, which can be used to direct light of different polarizations differently. For example, a polarization beam splitter having a polarization beam splitting coating can be used to reflect optical signals having a first polarization, and allow optical signals having a second polarization perpendicular to the first polarization to pass therethrough. Thus, an optical signal input along port one having a first polarization can be reflected to port two. The optical signal emerges from port two, passes through a quarter-wave plate once, is reflected from a reflection etalon back to port two, and passes through the quarter-wave plate a second time on its way back to port two. The quarter waveplate 320 acts to rotate the polarization of the optical signal by 90 degrees so that the optical signal is output from the polarizer 310 on a different port (e.g., port 3) than the port that the optical signal entered. Conversely, the optical signal path can be reversed such that an optical signal can be input into port 3 and output at port 1.

The tuner 340 can be used to change the refractive index of the medium between the two mirrors of the etalon 330 in order to adjust the resonant center of the etalon 330 to achieve a desired delay response. The refractive index of the medium between the two mirrors of an etalon can be changed by changing the temperature of the medium. Another way to change the refractive index of the medium is to change the electric field in the medium. In one implementation, the etalon tuner (e.g., tuner 340) is a heater. The heater can be position adjacent to etalon 330 in order to locally heat the etalon 330 and change the refractive index of the material inside. In one implementation, the heater is a layer of conductive thin film coupled to a rear surface of the etalon 330. In one implementation, the heater is controlled using a controller (not shown) coupled to the heater using electrical control lines. The controller controls the tuner 340 in order to adjust the centers of the characteristic resonant frequency of the etalon 330.

In another implementation, one or more electrodes can be used instead of a heater to change the refractive index within the etalon 330. For example, the medium between the mirrors of the etalon 330 can be an electro-optic material such as Lithium Niobate crystal in which the refractive index can be changed based on a change in the electric field. As with a heater, the electrodes can be controlled by a controller. In other implementations, changing the index of refraction can be performed using other means. For example, a cooling device can be used instead of a heater.

Polarizer 310 can be one of a variety of conventional polarizers. Polarizer 310 can be of the form of a Wollaston or Rochon polarizer, each of which use birefringent materials having indices of refraction that allow optical signals having one polarization to be input along one port in a direction different from the perpendicularly polarized output along another port.

Figure 4:
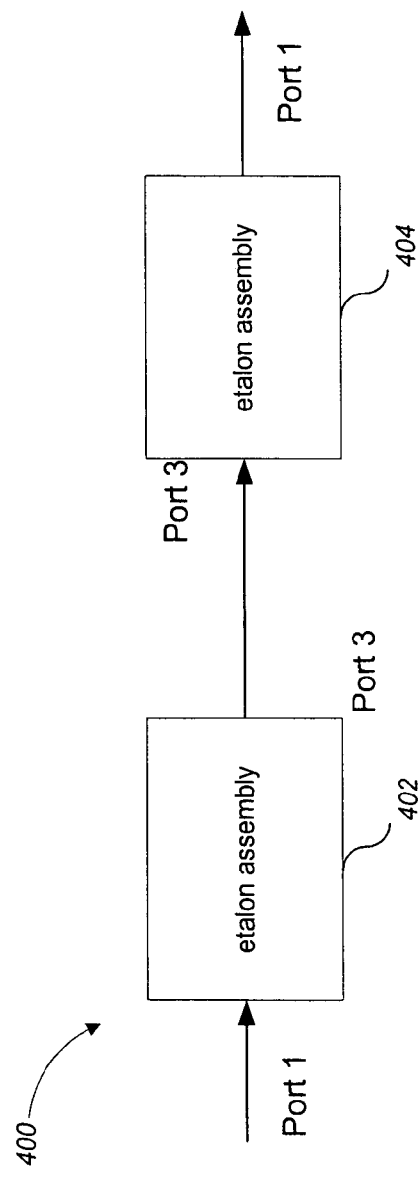
FIG. 4 is a block diagram illustrating two polarizer-quarter waveplate-etalon assemblies coupled in series.

More than one polarizer-quarter waveplate-etalon assembly (similar in structure to the assembly shown in FIG. 3 and hereinafter referred to simply as an etalon assembly) can be arranged together to create a compact dispersion compensation module in which each etalon contributes a portion of the overall dispersion compensation. As shown in FIG. 4, etalon assemblies 402 and 404 can be arranged so that an output from a polarizer in a first etalon assembly at a port three is provided as an input to a port (i.e., port three) of a second etalon assembly thereby forming a dispersion compensation module. Alternatively, a dispersion compensation module can be created by coupling a pair of etalon assemblies at port one. Any number of etalon assemblies can be arranged together based on the desired total dispersion compensation. Additionally, more than one dispersion compensation module can be coupled together.

Figure 5A:
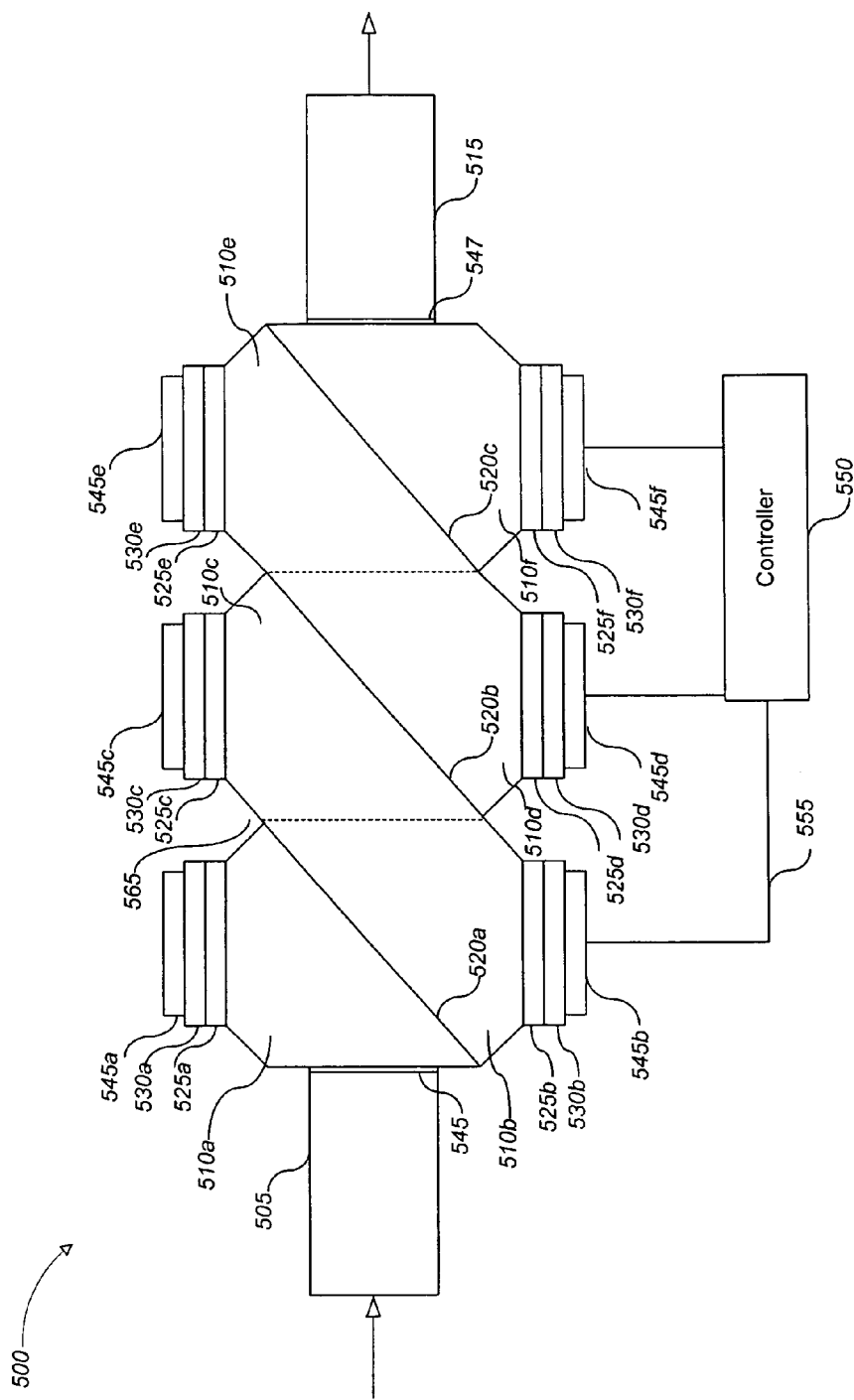
FIG. 5A–B illustrate one implementation of a dispersion compensation module having separate input and output collimators.
Figure 5B:
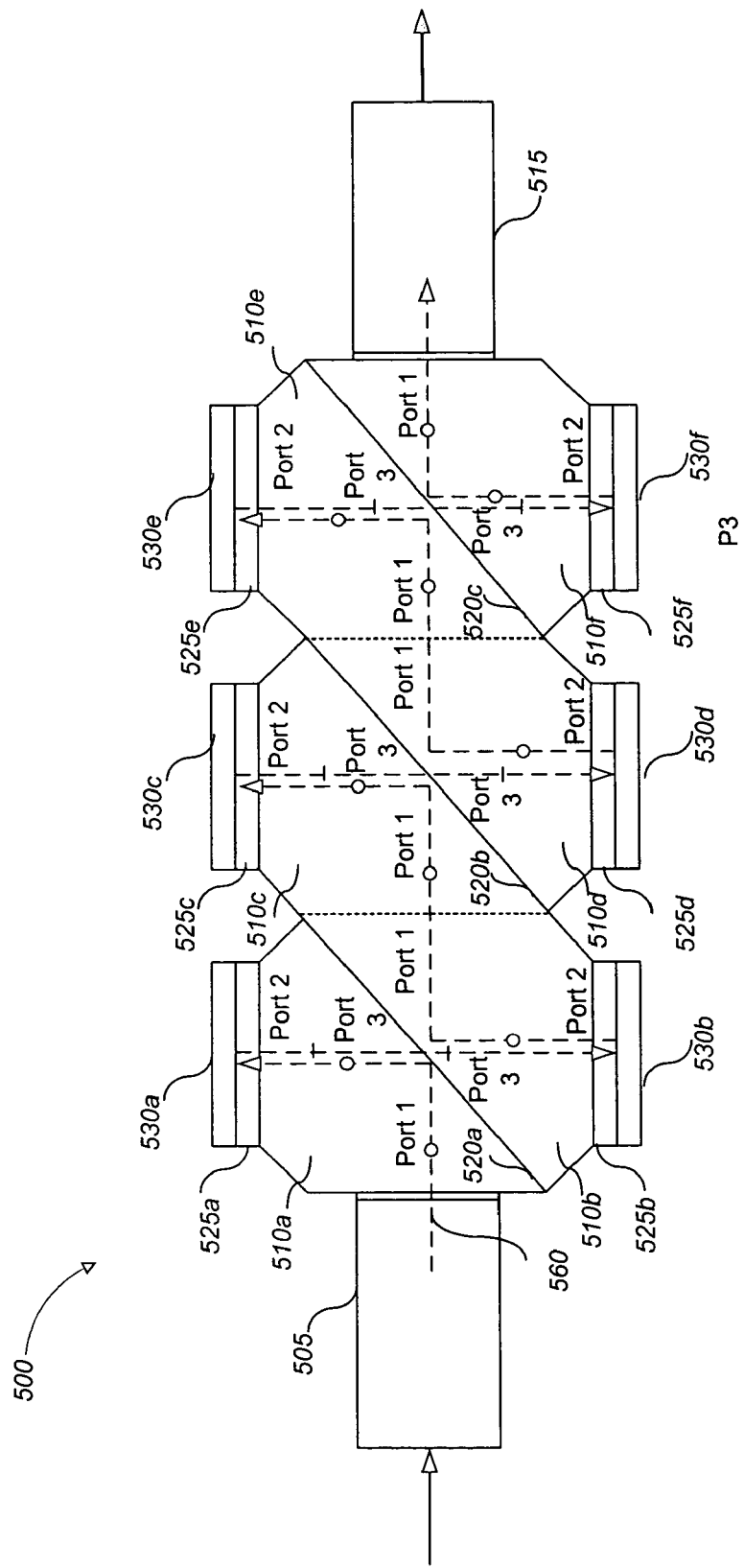

FIGS. 5A and 5B illustrate one implementation of a dispersion compensation module 500. Dispersion compensation module 500 includes a first single polarization collimator 505, an array of etalon assemblies 510a–510f, and an second single polarization collimator 515. The array of etalon assemblies 510 includes shared polarization splitting coatings 520a, 520b, and 520c, quarter waveplates 525a–525f and etalons 530a–530f. Etalons 525a and 525b share polarization splitting coating 520a, etalons 530c and 530d share polarization splitting coating 520b, and etalons 530e and 530f share polarization splitting coating 520c. The shared polarization splitting coatings 520 define a port (i.e., port three) for each etalon assembly 510 (as shown in FIG. 5B). Thus, polarization splitting coating 520a defines a port for etalon assemblies 510a and 510b. The space between the etalons 530 and polarization splitting coatings 520 can be filled with air, glass, or another material. In one implementation, along the length of the array of quarter waveplate etalon assemblies 510 are grooves, or notches 565. The notches 565 improve thermal isolation of the etalons 525 and facilitate independent tuning.

Referring now to FIG. 5B, in one implementation, an etalon assembly 510 is coupled to a subsequent etalon assembly 510 in an inverse fashion, in that the etalon assemblies 510 are coupled at respective first ports or respective third ports so that a desired dispersion compensation results. In some cases etalon assemblies 510 are paired such that each pair shares a polarization splitting coating (e.g., polarization splitter coating 520a shared by etalon assemblies 510a and 510b).

Referring back to FIG. 5A, each etalon 530 includes a tuner (e.g., tuners 545a–545f), such as a heater, cooler, or electrode as described above with respect to FIG. 3. Each tuner 545 can be individually controlled by a controller 550 using electronic control lines 555 (not shown for etalons 530a, c, and e). One controller can be used to control all of the tuners 545 independently. In another implementation, more than one controller can be used to control the tuners 545. Tuners and controllers can be included in other example implementations of dispersion compensation modules provided below, but are omitted from subsequent figures for clarity. In one implementation, glass spacers 545 and 547 can be positioned between each single polarization collimators 505 and 515, respectively, and the array of etalon assemblies 510.

The operation of dispersion compensation module 500 is illustrated in FIG. 5B. For simplicity, tuners 545 and controller 550 have been omitted. Optical signal 560, having a single polarization, exits the first single polarization collimator 505 and enters the array of etalon assemblies 510. Optical signal 560 is reflected by polarization splitting coating 520a to quarter waveplate 525a. Quarter waveplate 535a rotates the polarization of optical signal 560 by 45 degrees. The optical signal is then incident upon etalon 530a, which applies a frequency delay to the optical signal. The reflected light from etalon 530a passes again through quarter waveplate 535a which rotates the polarization of the optical signal 560 by another 45 degrees. Thus, the optical signal now has a polarization that is 90 degrees from the initial polarization upon exiting the first single polarization collimator 505. Because of the 90 degree change in polarization, the optical signal which previously was reflected by polarization splitting coating 520a now passes through polarization splitting coating 520a. Optical signal 560 then passes through quarter waveplate 535b which rotates the polarization of the optical signal 560 by 45 degrees. Light then reflected by etalon 530b passes again through quarter waveplate 535b, which rotates the optical signal 560 by another 45 degrees. Optical signal 560 then has a single polarization equivalent to the initial polarization of the optical signal 560. Consequently, the optical signal 560 is reflected again by polarization splitting coating 520a (but on the opposite side of the device) and directed to polarization splitting coating 520b. The process continues in a similar fashion with respect to the remaining etalons 530b–f, until the optical signal 572 enters second single polarization collimator 510. Each etalon 530 contributes to an overall group delay profile applied to the optical signal 560. The summed group delay provides dispersion compensation for some or all of the optical signal's chromatic dispersion.

Figure 6:
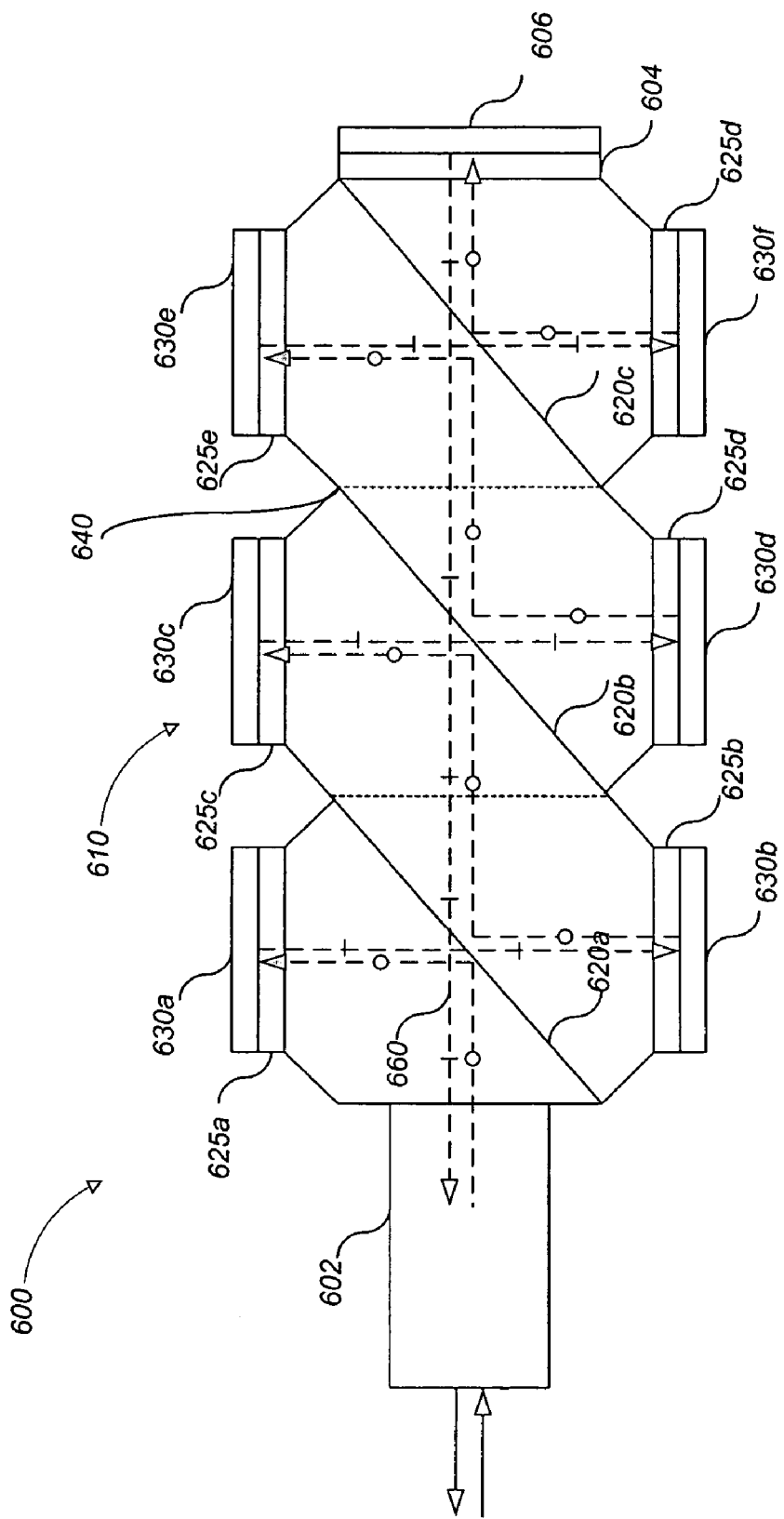
FIG. 6 illustrates an alternative implementation of a dispersion compensation module having a single input and output collimator.

FIG. 6 illustrates another implementation of a dispersion compensation module 600. Dispersion compensation module 600 includes a single polarization collimator 602, an array of etalon assemblies 610, a quarter waveplate 604, and a mirror 606. The array of etalon assemblies 610 includes shared polarization splitting coatings 620a, 620b, and 620c, quarter waveplates 625a–625f and etalons 630a–630f. Etalons 625a and 625b share polarization splitting coating 620a, etalons 630c and 630d share polarization splitting coating 620b, and etalons 630e and 630f share polarization splitting coating 620c. As in FIG. 5, each etalon 630 can include a tuner (not shown) controlled by a controller (not shown). Notches 640 can be positioned between adjacent etalons 630 in order to thermally isolate the etalons 630. In other implementations, the notches 640 can be omitted. Further, in one implementation, a single etalon can extend the full length of the array instead of a plurality of discrete etalons. The optical signal can then impinge the single etalon multiple times as the optical signal traverses the dispersion compensation module 600. Similarly, the separate quarter waveplates on one side of the dispersion compensation module can be replaced by a single long quarter waveplate.

In operation, the path of an optical signal 660 through dispersion compensation module 600 is similar to the path of optical signal 560 in dispersion compensation module 500 shown in FIG. 5B above. However, the second single polarization collimator of FIG. 5 is replaced by quarter waveplate 604 and mirror 606. Quarter waveplate 604 and mirror 606 function to reflect the optical signal 660 back through the polarization splitting coatings 620, returning the optical signal 660 to the first single polarization collimator 602. In one implementation, an additional etalon is positioned in place of mirror 606, which provides additional frequency delay to the optical signal. The single polarization collimator 602 can operate as a three port optical circulator, thus, an optical signal 660 entering the dispersion compensation module 600 at a port one of the single polarization collimator 602 exits at port two to enter the array of etalon assemblies 610. The optical signal 660 reflected back through the etalon assemblies 610 from mirror 606 re-enters the single polarization collimator 602 at the second port and exits at a port three. In an alternative implementation, quarter waveplate 604 is omitted. Thus, the optical signal 660 proceeds from etalon mirror 606 in the reverse path such that each of the etalons 630 will be impinged twice by the optical signal 660 before returning to single polarization collimator 602. In other implementations, a collimator can be coupled to a circulator that performs routing of optical signals.

Figure 7:
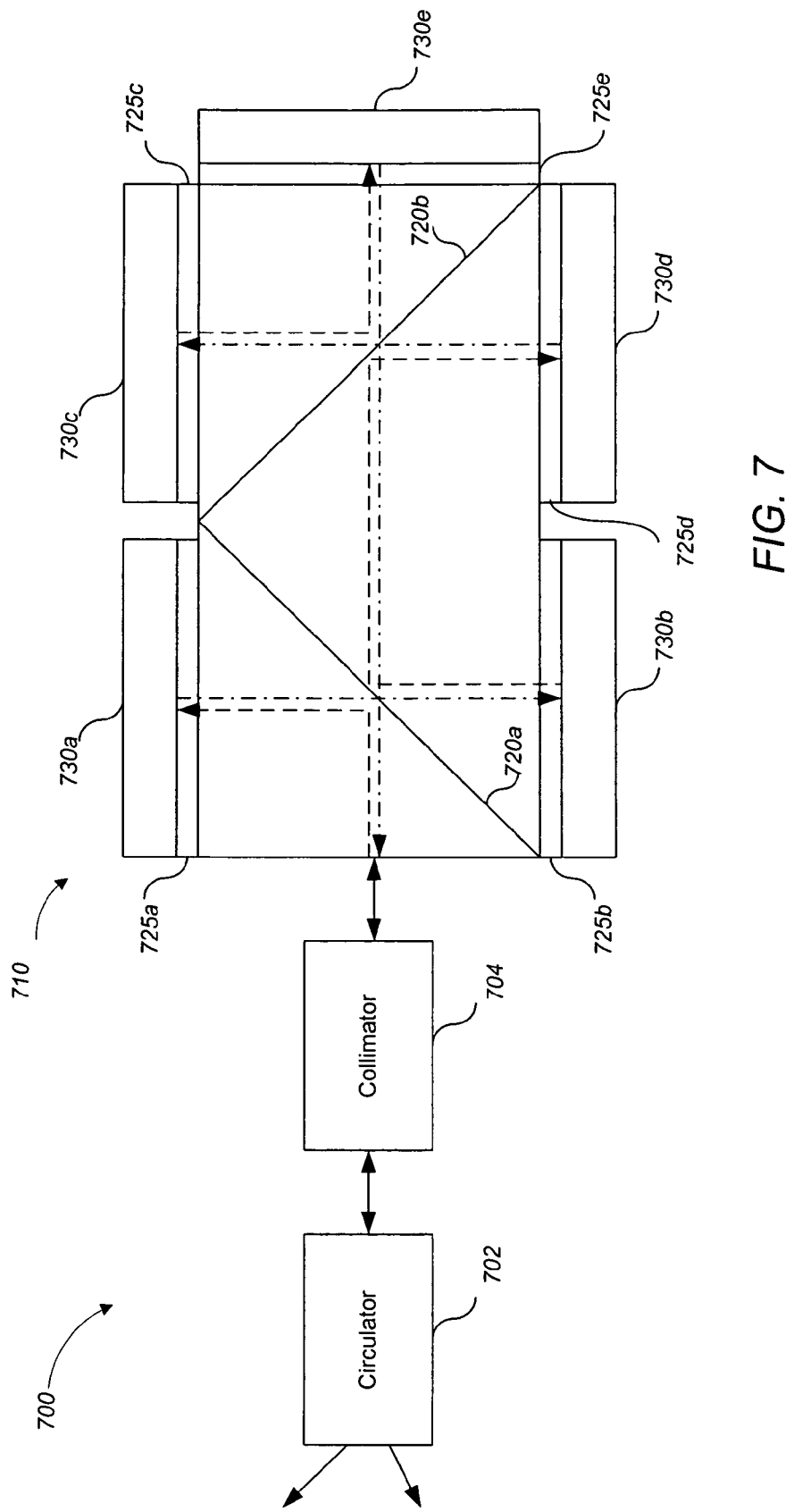
FIG. 7 illustrates an alternative implementation of a dispersion compensation module.

FIG. 7 illustrates an implementation of a dispersion compensation module 700. Dispersion compensation module 700 includes a circulator 702, a single polarization collimator 704, and an array of etalon assemblies 710 that include polarization splitting coatings 720a and 720b, quarter waveplates 725a–e, and etalons 730a–e.

In an alternative implementation, two single polarization collimators can be positioned on a single side of the array of etalon assemblies 730, instead of a single polarization collimator 704 and circulator 702 pair as shown in FIG. 7. One single polarization collimator can be used as an input collimator and a second single polarization collimator can be used as an output collimator for an optical signal.

In another implementation of dispersion compensation module 700, collimator 704 is a conventional collimator that does not output a single polarization state. The arbitrary polarization can be referred to by a first polarization component "s" and a second polarization component "p", the s component being reflected by the polarization splitting coating 720a and the p component passing through the same polarization splitting coating 720a. In this example, the s component of an input optical signal will be reflected to quarter waveplate 725a, and subsequently to quarter waveplate 725b in a manner described above with reference to FIGS. 5A and 5B. Component s takes a path which traverses a height of the etalon assembly 710 four times, and traverses an entire length of the etalon assembly 710 before impinging upon a quarter wave plate 725e and etalon 730e situated at the end of the etalon assembly 710 opposite collimator 704. The optical signal is rotated by quarter waveplate 725e such that when reflected back the optical signal passes through both polarization splitting coatings 720 and back out through collimator 704.

Inversely, the p component of the signal traverses both polarization splitting coatings 720 initially until the optical signal is incident upon quarter waveplate 725e and etalon 725e. Upon being reflected back though quarter waveplate 725e from etalon 730e the p component will be rotated to a polarization state which causes the p component of the optical signal to be reflected to quarter waveplate 725c and etalon 730c. The optical signal will continue to traverse each of the etalons 730 in a similar fashion as described previously until reaching collimator 704.

Figure 8:
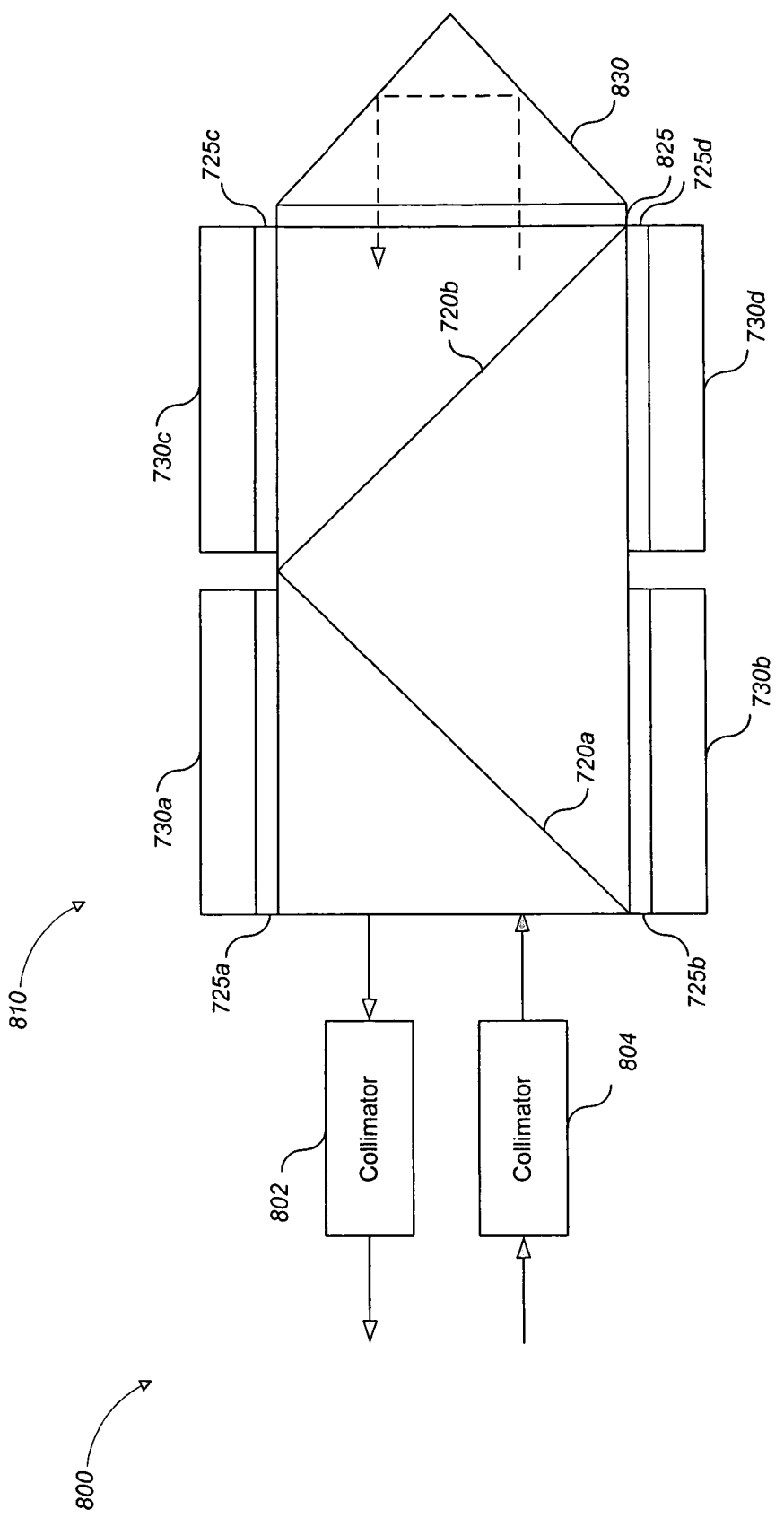
FIG. 8 illustrates an alternative implementation of a dispersion compensation module having a retro-reflector.

FIG. 8 illustrates an implementation of a dispersion compensation module 800 including two collimators. A lower collimator 804 operates as an input collimator and the upper collimator 802 operates as an output collimator. Dispersion compensation module 800 is similar to the dispersion compensation module 700 shown in FIG. 7 except that a retro-reflection device 830 is used, in place of etalon 730e, to reflect the light along a path toward the upper collimator 802. Because of quarter waveplate 825, an optical signal component which passes directly through the dispersion compensation module 800 on the lower path will not pass directly through the dispersion compensation module 800 on the upper path, and a component which did not pass directly through the dispersion compensation module 800 on the lower path will pass directly through the dispersion compensation module 800 on the upper path.

Figure 9A:
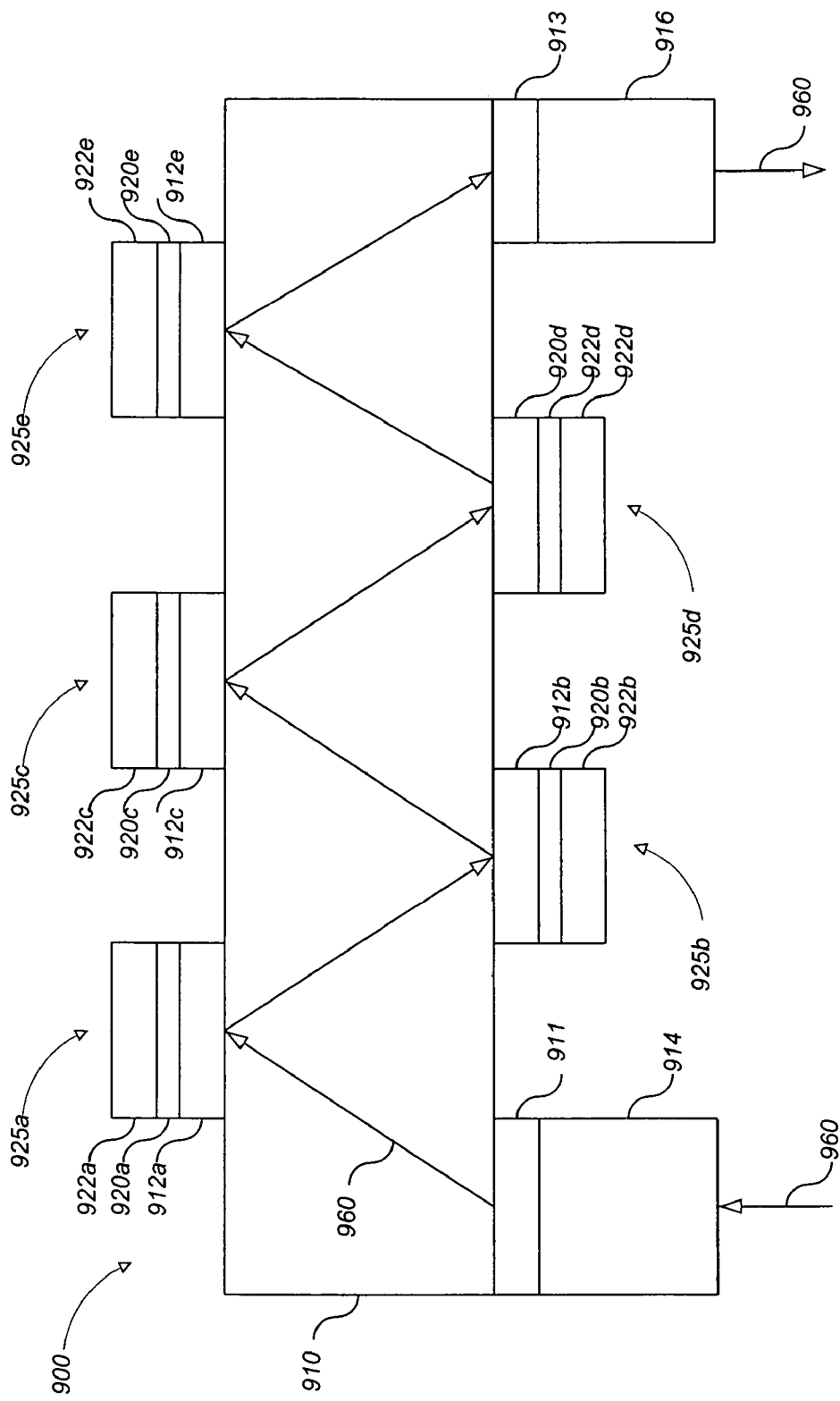
FIG. 9A illustrates an alternative implementation of a dispersion compensation module having input and output single polarization collimators.

FIG. 9A illustrates an implementation of a dispersion compensation module 900. dispersion compensation module 900 includes an input single polarization collimator 914, a first polarizer 911, an output single polarization collimator 916, a last polarizer 913, and series of etalon assemblies 925a–925e on two sides of a spacer 910. In one implementation, the spacer 910 is made of a glass substrate. Each etalon assembly 925 includes a polarizer 912, a quarter waveplate 920 and an etalon 922. A polarizer, such as a Wollaston prism, can be positioned at each etalon 922 (e.g., polarizers 912a–912e) and at the single polarization collimators 914 and 916 (e.g., first and last polarizers 911 and 913). The polarizers, as described above, allow for an optical signal 960, having a first specific polarization, to be redirected in a first direction, and a signal having a second polarization perpendicular to the first polarization, to be directed in a second direction. For example, single polarization collimator 914 is arranged so that the polarization state of the optical signal 960 exiting the single polarization collimator 914 is directed by first polarizer 911 to etalon assembly 925a. Each etalon assembly 925 has a port (i.e., port one) for accepting optical signal 960 having a single polarization into the polarizer 912 and directing the optical signal 960 to a second port (i.e., port two of the polarizer 912). Coupled tot port two is a quarter waveplate 920 and reflection etalon 922. When the optical signal 960 re-enters the polarizer 912 at port two, the optical signal 960 has a polarization perpendicular to the optical signal initially output at port two, which causes the optical signal 960 to be directed to a third port (i.e., port three) of polarizer 912, and then subsequently to the next etalon assembly 925 (e.g., 925b). Each subsequent etalon assembly 925 is arranged inverse the last, (i.e., an optical signal output from a port three of etalon assembly 925a will be directed to an input port three of an etalon assembly 925b). A final polarizer 913, coupled to output single polarization collimator 916, is configured to direct the angular optical signal from the etalon assembly 925e to output single polarization collimator 916. Perpendicular angles of incidence at the etalons are ensured by the polarizers. Additionally, the angle of incidence upon each polarizer can be relatively sharp.

Figure 9B:
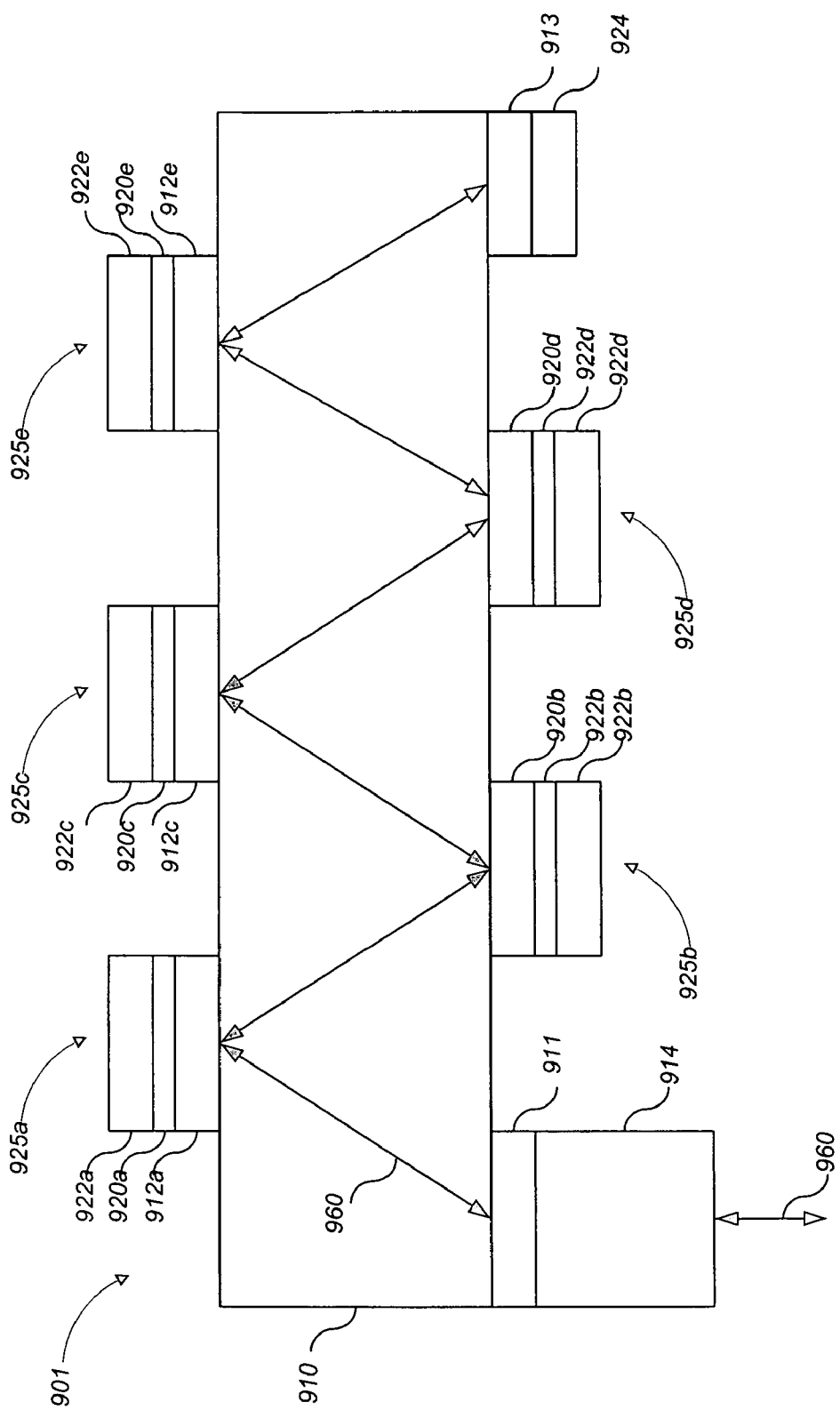
FIG. 9B illustrates an alternative implementation of a dispersion compensation module having one single polarization collimator for input and output.

In FIG. 9B, an implementation of a dispersion compensation module 901 is illustrated. Dispersion compensation module 901 is similar to dispersion compensation module 900 of FIG. 9A, except that an etalon 924 is provided at port two of final polarizer 913 instead of output single polarization collimator 916. Because the polarization of the optical signal has not been changed by a quarter waveplate, the optical signal 960 reflects through the polarizer the exact same way the optical signal 960 entered, and traverses a reverse path back through the dispersion compensation module 901, to exit the input single polarization collimator 914 through which the optical signal 960 entered the dispersion compensation module 901. In one implementation, a Wollaston polarizer is used. Other polarizers can be used including a Rochon polarizer.

FIGS. 10 and 11 illustrate dispersion tolerant receiver modules 1000 and 1100. In FIGS. 10 and 11, an optical signal 1010 enters the dispersion tolerant receiver module (e.g., dispersion tolerant receiver modules 1000 and 1100) and then passes through a dispersion compensation module 1015. Dispersion compensation module 1015 can be similar to the dispersion compensation modules discussed above with respect to FIGS. 5–9. The optical signal 1010 then enters a photodetector 1020, 1120 which converts the optical signal to a comparable electrical signal, before exiting the dispersion tolerant receiver module as an electrical signal 1030, 1130, respectively. The photodetector 1020 in dispersion tolerant receiver module 1000 can be a PIN photodiode detector in combination with a trans-impedance amplifier ("PIN-TIA"). The photodetector 1120 in dispersion tolerant receiver module 110 can be an APD photodiode detector in combination with a trans-impedance amplifier ("APD-TIA"). In other implementations, other types of photodetectors can be used.

Figure 12:
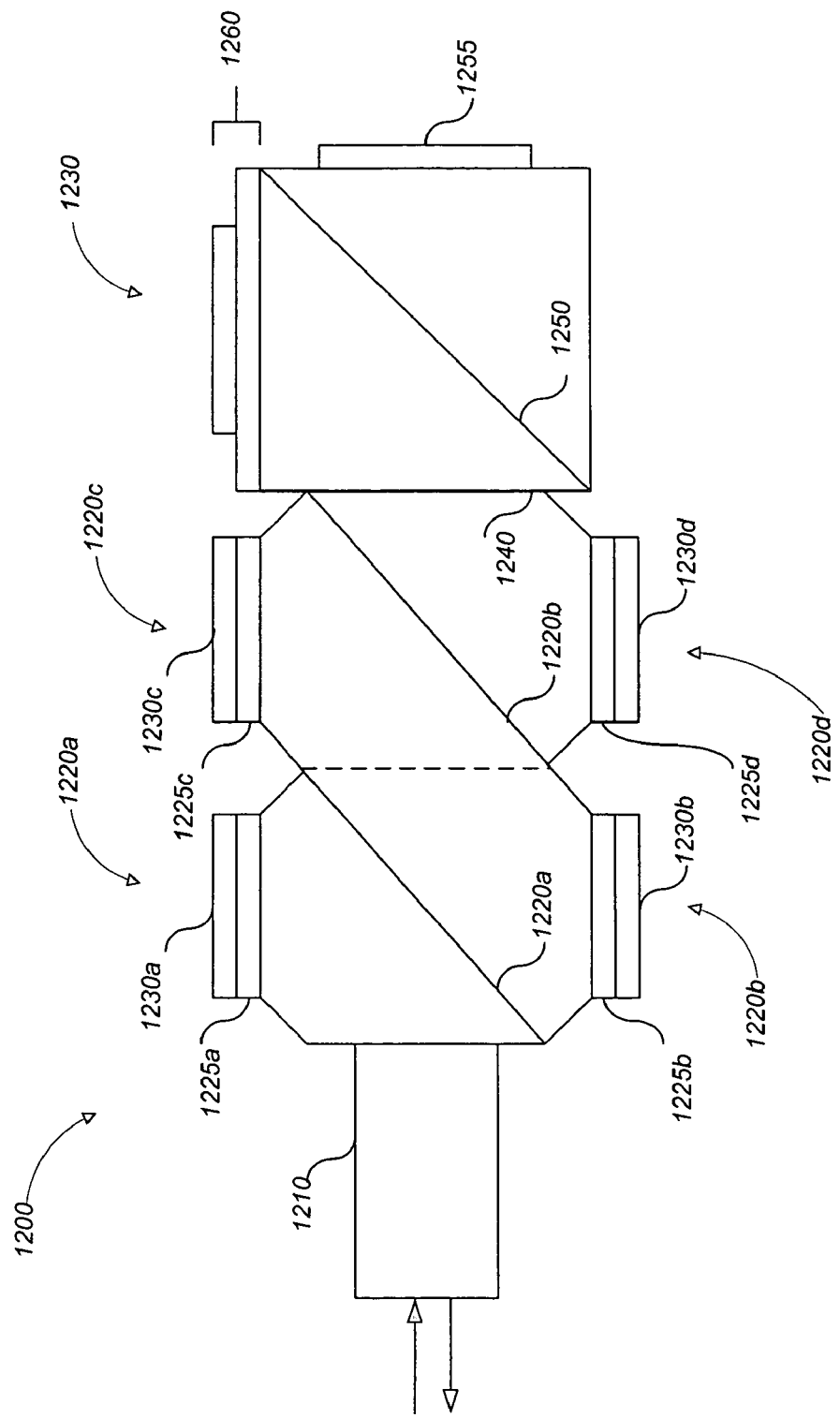
FIG. 12 illustrates a dispersion compensation module including wavelength tracking.

FIG. 12 illustrates a dispersion compensation module 1200 that includes wavelength tracking. The dispersion compensation module 1200 includes a collimated beam circulator 1210, an array of etalon assemblies 1220a–d, which include polarization splitting coatings 1220a and 1220b, quarter waveplates 1225a–d, and etalons 1230a–d, and a monitoring apparatus 1230. The monitoring apparatus 1230 is positioned at one end of the array of etalon assemblies 1220a–d behind a reflective surface 1240, which, in one implementation is partially transparent. In one implementation, the transparency is 10 percent. The partial transparency of reflective surface 1240 acts as a tap for the optical signal traversing the dispersion compensation module. The monitoring apparatus includes a beam splitter 1250 that receives the tapped optical signal and outputs a first split portion of the beam to a large area power monitor photodiode ("reference PD") 1255, and another portion of the beam to a photodiode and monitor etalon pair 1260. In one implementation, the beam splitter 1250 is a 50 percent splitter. When the wavelength of the optical signal entering the dispersion compensation module shifts, the ratio of the signal measured at the reference PD 1255 and the photodiode behind the monitor etalon pair 1260 changes. By calibrating the monitoring apparatus for optical signals having the a desired position within an anticipated frequency channel, if the frequency drifts, a magnitude of the drift can be detected by a ratio of powers measured at the photodiodes. To compensate for drift, the entire group delay profile provided by the various arrayed etalons can be adjusted in frequency to match the drift of the incoming optical signal. A controller can be provided to monitor the ratio of the powers measured at the photodiodes. The controller can make a frequency adjustment by adding a common tuning factor to the etalon assemblies 1220, for example, by controlling the heating or cooling all of the etalons of the dispersion compensation module by a same amount (e.g., add a bias).

Figure 13:
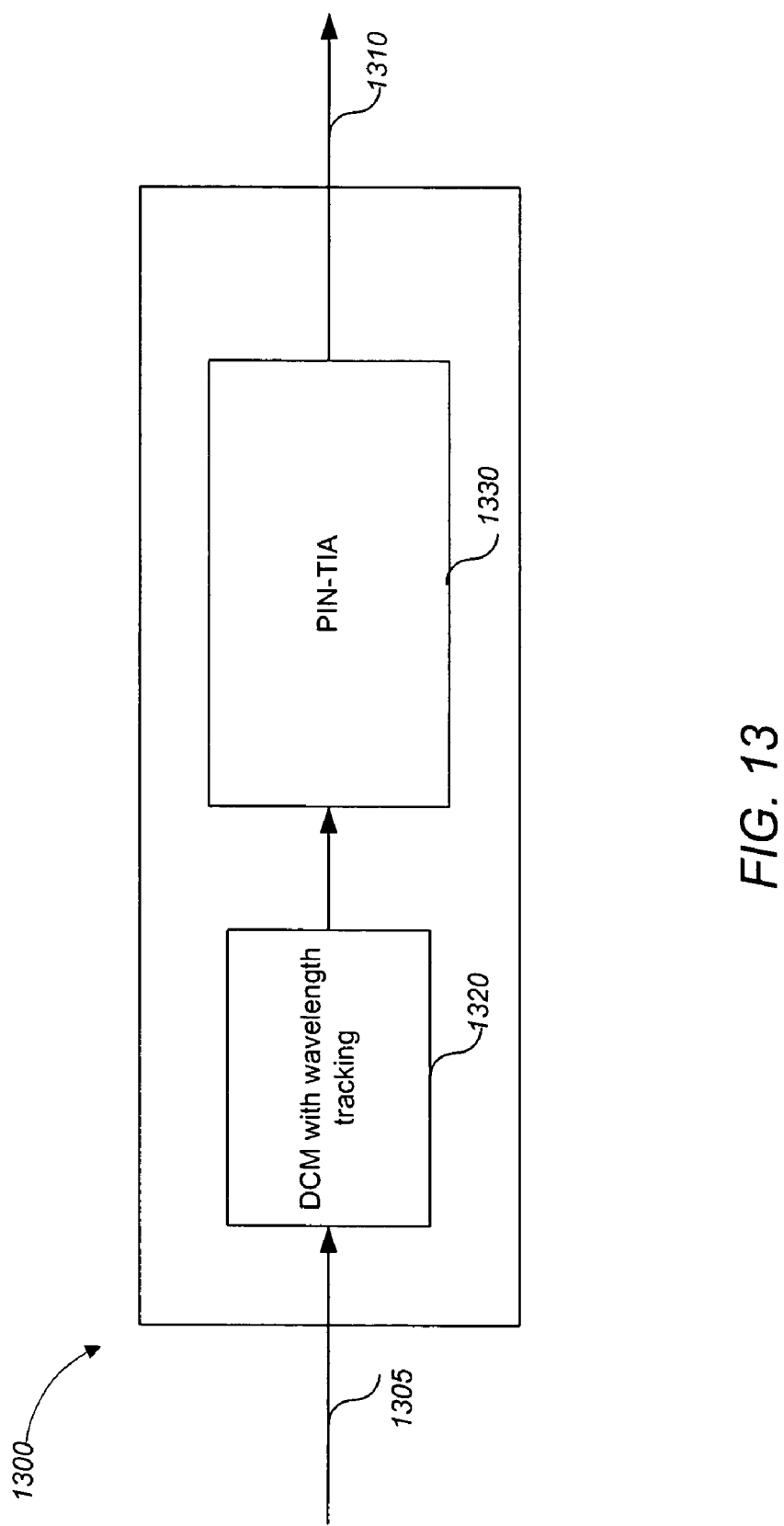
FIG. 13 illustrates a dispersion tolerant receiver module having a dispersion compensation module including wavelength tracking Like reference symbols in the various drawings indicate like elements.

FIG. 13 illustrates an implementation of a dispersion tolerant receiver module 1300. Dispersion tolerant receiver module 1300 includes a dispersion compensation module with embedded wavelength tracking 1320 coupled to a PIN-TIA photodetector 1330. An optical signal 1305 enters the dispersion tolerant receiver module 1300 and passes through the dispersion compensation module with embedded wavelength tracking 1320. The optical signal 1305 then enters the PIN-TIA photodetector 1330 which translates the optical light signal into an electrical signal 1310, which is output from the dispersion tolerant receiver module 1300.

Although the present invention has been described in accordance with the implementations shown, one of ordinary skill in the art will readily recognize that there could be variations to the implementations and those variations would be within the spirit and scope of the present specification. Accordingly, many modifications may be made by one of ordinary skill in the art without departing from the spirit and scope of the appended claims.

What is claimed is:

1. A dispersion compensation module comprising:
   a polarization collimator;
   a polarization beam splitter coupled to the polarization collimator and having a first port, a second port, and a third port, the polarization beam splitter operable to receive a light beam at the first port, having a single polarization, from the polarization collimator, such that substantially the entire light beam is directed from the first port to the second port;
   a first reflection etalon optically coupled to the second port of the polarization beam splitter; and
   a second reflection etalon optically coupled to the third port of the polarization beam splitter,
   where the polarization beam splitter is positioned between the first reflection etalon and the second reflection etalon such that a light beam from the first reflection etalon passes, without deflection, through the polarization beam splitter to the second reflection etalon.

2. The dispersion compensation module of claim 1, wherein the dispersion compensation module is operable to apply a group delay profile to at least one optical signal.

3. The dispersion compensation module of claim 1, wherein the polarizer is operable to redirect a first optical signal having a first polarization input at the first port to be output from the second port and to redirect a second optical signal having a second polarization perpendicular to the first polarization input at the second port to be output at the third port.

4. The dispersion compensation module of claim 3, wherein the first reflection etalon is operable to apply a group delay profile to the first optical signal output from the second port.

5. The dispersion compensation module of claim 1, further comprising a quarter-waveplate positioned between the first reflection etalon and to second port of the polarization beam splitter, wherein the quarter-waveplate is operable to rotate a polarization of a first optical signal output from the second port by 45 degrees and allow the first optical signal to propagate toward the first reflection etalon, the quarter waveplate for rotating a polarization of an optical signal reflected back from the first reflection etalon by a further 45 degrees into a second optical signal having a second polarization perpendicular to the first polarization and allowing the second optical signal to be input at the second port of the polarizer.

6. The dispersion compensation module of claim 1, further comprising:
one or more polarization collimators coupled to the polarizer quarter wave plate etalon assembly.

7. The dispersion compensation module of claim 1, further comprising:
a tuner coupled to the first reflection etalon, operable to adjust a resonant frequency of the first reflection etalon.

8. The dispersion compensation module of claim 7, further comprising:
a controller coupled to the tuner and operable to control the tuner.

9. The dispersion compensation module of claim 7, wherein the tuner is a heater.

10. The dispersion compensation module of claim 7, wherein the tuner is one or more electrodes.

11. A dispersion compensation module for applying a desired group delay profile to an input optical signal, the dispersion compensation module comprising:
a plurality of etalon assemblies, each etalon assembly for applying a group delay profile to an optical signal, each etalon assembly ranged so that the optical signal passes at least once therethrough, each etalon assembly comprising:
a polarization beam splitter having a first port, a second port, and a third port operable to reflect an optical signal, having a first polarization, input at the first port to be output from the second port and operable to direct an optical signal, having a second polarization perpendicular to the first polarization, input at the second port to be output at the third port;
a first reflection etalon for application of a group delay profile to the optical signal output from the second port;
a first quarter-wave plate positioned between the first reflection etalon and the second port of the polarization beam splitter, for rotating a polarization of the optical signal output from the second port by 45 degrees and allowing the optical signal to propagate toward the first reflection etalon, said the quarter-wave plate operable to rotate a polarization of the optical signal reflected back from the first reflection etalon by a further 45 degrees such that the optical signal has a second polarization perpendicular to the first polarization and allowing the optical signal to enter the second port of the polarization beam splitter and pass, without deflection, through the polarization beam splitter to the third port;
a second reflection etalon positioned such that the polarization beam splitter is located between the first reflection etalon and the second reflection etalon and operable to apply a group delay profile to the optical signal output from the third port; and
a second quarter-wave plate positioned between the second reflection etalon and the third port of the polarization beam splitter; and
a polarization collimator coupled to the first port of a first polarization beam splitter of the plurality of etalon assemblies and operable to provide the optical signal to the first port of the polarization beam splitter having a single polarization.

12. A dispersion compensation module comprising:
a polarization collimator; and
an etalon assembly pair optically coupled to the polarization collimator, including:
a first etalon assembly including;
a first polarizer having a first port, a second port, and a third port, the first polarizer coupled to the polarization collimator at the first port and operable to provide an optical signal to the first port, having a single polarization, such that the optical signal is directed to the second port of the polarizer, where the third port of the first polarizer is formed by a polarization splitter coating shared with a second polarizer;
a first reflection etalon; and
a first quarter-waveplate positioned between the reflection etalon and the second port of the polarizer; and
a second etalon assembly including:
a second polarizer having a first port, a second port, and a third port, the second polarizer coupled to the first polarizer at the third port formed by the shared polarization splitter coating;
a second reflection etalon; and
a second quarter-waveplate positioned between the reflection etalon and the second port of the second polarizer;
wherein, the first and second polarizers are positioned between the first and second etalons such that an optical signal reflected from the first etalon passes, without reflection, through the first and second polarizers to the second etalon.

13. The dispersion compensation module of claim 12, wherein the first polarizer is operable to direct the optical signal, having a first polarization, input at the first port to be output from the second port and to direct the optical signal, having a second polarization perpendicular to the initial polarization, input at the second port to be output at the third port.

14. The dispersion compensation module of claim 12, wherein the second polarizer is operable to direct the optical signal, having a first polarization, input at the third port to be output from the second port and to direct the optical signal, having a second polarization perpendicular to the first polarization, input at the second port to be output at the first port.

15. The dispersion compensation module of claim 12, wherein the dispersion compensation module is operable to apply a group delay profile to at least one optical signal.

16. The dispersion compensation module of claim 12, wherein each quarter waveplate is operable to rotate an initial polarization of an optical signal output from a second port by 45 degrees and allow the optical signal to propagate toward each reflection etalon, the quarter-waveplate for rotating a polarization of an optical signal reflected back from the reflection etalon by a further 45 degrees into an optical signal having a polarization perpendicular to the initial polarization and allowing the optical signal to be input at a same second port of each polarizer.

17. The dispersion compensation module of claim 12, further comprising:
   a polarization collimator coupled to port one of each polarizer.

18. The dispersion compensation module of claim 12, further comprising:
   a reflector coupled to the second etalon assembly.

19. The dispersion compensation module of claim 12, further comprising:
   a tuner coupled to each reflection etalon and operable to adjust a resonant frequency of each reflection etalon.

20. The dispersion compensation module of claim 19, further comprising:
   a controller coupled to each tuner and operable to control each tuner.

21. The dispersion compensation module of claim 19, wherein the tuner is a heater.

22. The dispersion compensation module of claim 19, wherein the tuner is one or more electrodes.

23. The dispersion compensation module of claim 12, further comprising:
   a plurality of etalon assembly pairs, wherein a first port of a each etalon assembly pair is coupled to a first port of a another etalon assembly pair such that an optical signal can be directed to input at a first port of a first etalon assembly pair of the plurality of etalon assembly pairs and output at a first port of a last etalon assembly pair of the plurality of etalon assembly pairs.

* * * * *